United States Patent [19]

O'Neill

[11] Patent Number: 4,625,819
[45] Date of Patent: Dec. 2, 1986

[54] VERTICALLY STABLE FRICTION-FREE MICROBALANCE

[75] Inventor: Michael O'Neill, Wilton, Conn.
[73] Assignee: The Perkin-Elmer Corporation, Norwalk, Conn.
[21] Appl. No.: 780,067
[22] Filed: Sep. 25, 1985
[51] Int. Cl.⁴ .......................... G01G 7/00; G01G 1/22; G01G 21/28
[52] U.S. Cl. .................................... 177/212; 177/190; 177/244; 177/DIG. 6; 177/DIG. 9
[58] Field of Search .................. 177/244, 246, DIG. 9, 177/DIG. 6, 190, 212

[56] References Cited

U.S. PATENT DOCUMENTS

| | | | |
|---|---|---|---|
| Re. 26,100 | 10/1966 | Cahn | 177/212 X |
| 591,202 | 10/1897 | Witzel | 177/190 |
| 849,418 | 4/1907 | Nickerson | 177/246 X |
| 2,631,027 | 3/1953 | Payne | 177/212 X |
| 3,148,742 | 9/1964 | Giulie | 177/246 X |
| 3,717,210 | 2/1973 | Sieswerda | 177/212 X |
| 4,106,220 | 8/1978 | Hurd | 177/190 X |
| 4,153,124 | 5/1979 | Knothe et al. | 177/212 X |

Primary Examiner—George H. Miller, Jr.
Attorney, Agent, or Firm—Francis L. Masselle; Edwin T. Grimes; Thomas P. Murphy

[57] ABSTRACT

The microbalance includes a mounting having two vertically aligned elongated flexible metal tension members, the upper and lower ends of the tension members being attached to a fixed support. The attachment of one end of each of the tension members to the fixed support is carried out by a resilient tension means. A pivot crossbeam is fixedly attached to the balance beam, and the ends of the pivot beam are fixedly attached respectively to the tension members at points intermediate to the ends. Deflection of the microbalance beam is accommodated by flexure of the metal tension members.

16 Claims, 6 Drawing Figures

VERTICALLY STABLE FRICTION-FREE MICROBALANCE

BACKGROUND OF THE INVENTION

Microbalances are highly valued for use in scientific and medical laboratories. They are especially useful in measuring weight and weight changes of extremely small samples of material with very high accuracy. For instance, The Perkin-Elmer Corporation, Analytical Instruments Department, of Main Avenue, Norwalk, Conn. 06856, U.S.A., offers microbalance systems products called the "AD-4 Autobalance" and the "AD-6 Autobalance" which are very accurate, and which are capable of weighing small samples of two milligrams and less to a precision of 0.2 micrograms. Also, microbalance devices are especially useful in thermal analysis instrumentation where a minute sample is typically heated, and the dissipation of the sample through evaporation or oxidation is continuously monitored and recorded in terms of the changing weight of the sample. Systems incorporating microbalances which accomplish this thermal analysis objective are referred to as thermogravimetric systems. For instance, The Perkin-Elmer Corporation, the above-mentioned vendor, offers a model TGS-1 thermogravimetric system of this kind.

In such apparatus, such as an autobalance, or a thermogravimetric system, it is common to provide for an automatic electronic counterweight equivalent by introducing an electromagnetic restoring force to the microbalance to bring the microbalance back to a null position while a weighing operation is undertaken, and measuring the signals applied to provide the electromagnetic force as an electrical measurement of the weight. A mechanical tare or counterweight also may be added to the system, if desired. This can improve the accuracy since the electronic counterweight then need not provide such a large electrical signal to restore the microbalance to the null position.

While extremely small samples can be handled with ease in present microbalance instruments, it is desirable, especially in the thermogravimetric systems, to use an initial sample which has an appreciable weight so as to increase the absolute value of the total weight change as heat is applied to the sample, to thereby increase the accuracy with which the results are measured.

Any friction in the bearings of the microbalance is obviously extremely undesirable. For this reason, it has been common to employ a frictionless bearing system for microbalances which incorporates a tensioned torsion wire at the rotational axis of the microbalance, the ends of the wire being connected to a fixed support, and the microbalance being attached at a point intermediate to the ends. As the microbalance rotates about this torsion wire, the wire is twisted, but no real friction is encountered. This ingenious method of suspension resembles that originally used in the d'Arsonval galvanometer.

While the torsion wire rotation axis support of a d'Arsonval galvanometer is often arranged vertically, when the torsion wire is used for the microbalance bearing, it obviously must be arranged horizontally.

Unfortunately, with the horizontal torsion wire microbalance bearing, when a substantial weight is to be measured, (within the microbalance weighing range) the torsion wire tends to sag, and the entire microbalance pivot therefore tends to sag. This is especially true when a physical counterweight is used on the microbalance, but it is also true when employing an electronic automatic counterbalance. Such displacement substantially reduces the accuracy of the instrument. This is particularly true in structures wherein the automatic electronic counterbalance operates by an electromagnetic force applied to the microbalance in the vicinity of the torsion wire bearing, for the sagging of the microbalance bearing upsets the alignment of the rotor and stator of the electromagnetic restoring force apparatus.

Accordingly, it is an important object of the present invention to provide a vertically stable friction-free microbalance structure which avoids the disadvantages of the sagging torsion wire bearing.

Another object of the invention is to provide a vertically stable friction-free microbalance structure in which the accuracy of the microbalance is not adversely affected by the weight of material being weighed, or by the combination of that weight and a physical counterbalance weight.

It is another object of the invention to provide a vertically stable friction-free microbalance structure which provides for greatly improved accuracy and reproducibility of results.

Another object of the invention is to provide a vertically stable friction-free microbalance structure which is singularly free of service and maintenance problems and difficulties.

Further objects and advantages of the invention will be apparent from the following description and the accompanying drawings.

SUMMARY OF THE INVENTION

In carrying out the invention there is provided a microbalance including a balance beam, means for attaching a weight to be measured to one end of said balance beam, electromagnetic torque generating means connected to said balance beam for overcoming the beam displacement caused by a weight to be measured, means for detecting when a beam displacement has occurred and operable to generate an electrical signal to control said torque generating means to thereby change torque to balance said beam to a null position, means for measuring the current of said torque generating means as a measure of the weight to be measured, a mounting means for said balance beam comprising at least two vertically aligned elongated flexible metal tension members, the upper ends of said tension members being attached to a fixed support, a crossbeam fixedly attached to said balance beam at a point of attachment intermediate to the ends thereof to form a pivot beam for said balance beam, said point of attachment being intermediate to the ends of said crossbeam, the ends of said crossbeam being fixedly attached respectively to portions of said tension members below said fixed support attachment.

DESCRIPTION OF PREFERRED EMBODIMENTS

Figure 1:
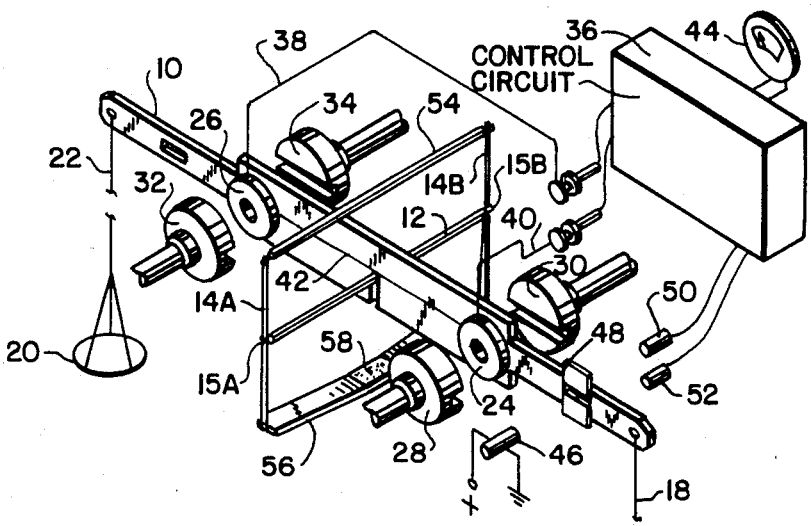
FIG. 1 is a skeletal, partially exploded perspective view of a preferred embodiment of the invention.

Referring particularly to FIG. 1, a microbalance balance beam is illustrated at 10 which is mounted and supported upon a crossbeam 12 which is in turn fixedly attached at its ends to vertically aligned tension members 14A and 14B at attachment points 15A and 15B. 15A and 15B are sometimes referred to below as "pivot points". The tension members 14A and 14B are formed of a flexible metal, preferably in the form of a very thin, narrow, ribbon. Because of the flexibility of the metal and the small dimension of the cross section of the tension members and because of a mode of attachment which preferably provides a minimum vertical dimension to the attachment between the crossbeam 12 and the vertical tension members, there is very little resistance to rotation of the crossbeam, and the resistance which does exist is a predictable and consistent small restoring force tending to restore the crossbeam to a horizontal position from any deflection away from the horizontal. There is no friction.

The microbalance may include a conventional weighing pan 16 for receiving material which is to be weighed, and which is suspended by means of a wire 18 to the end of the microbalance beam 10. A corresponding pan 20 is preferably suspended by a wire 22 to the other end of the microbalance beam 10. The pan 20 may be used for a physical counterweight, if desired.

The microbalance includes an electromagnetic torque generating structure including two windings 24 and 26 which operate within magnetic fields established by permanent magnets 28, 30, 32, and 34. Since the magnets 28-34 are all fixed, they are sometimes referred to below as "stator" magnets. The opposite poles of each of the magnets 28-34 are vertically aligned with respect to one another, and the upper poles and the lower poles of each pair of magnets are of opposite polarity so that the magnetic field of the stator structure formed by each pair of permanent magnets provides magnetic lines of force crossing in one direction at the top and crossing in the other direction at the bottom.

Figure 5:
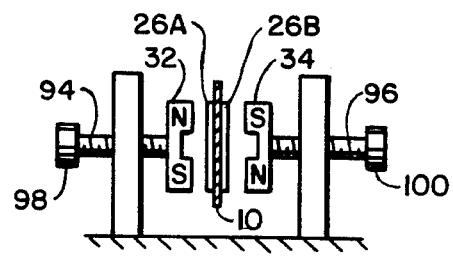
FIG. 5 is a sectional end view taken at section 5—5 in FIG. 2 and illustrating a slight modification of the invention.

FIG. 5 is a sectional end view which will be described more fully below in conjunction with FIG. 2. However, FIG. 5 is referred to briefly here because it illustrates the stator magnets together with indications of polarity alignments of those magnets.

Referring back again to FIG. 1, a control circuit 36 supplies a current through connecting wires 38 and 40 to the windings 24 and 26, which are connected in series through an interconnection 42. The current supplied by the control circuit 36 is sufficient to cause the windings 24 and 26 to provide electromagnetic fields which operate in conjunction with the permanent magnet stator fields to provide a restoring force to the microbalance beam 10 to restore the beam to a substantially centered horizontal position. The current necessary to accomplish this restoration serves as a measure of the unknown weight of the material being weighted in the pan 16. That current, or an electrical signal derived from that current, is displayed on a meter 44, or other display device such as a cathode ray tube or the like, which is connected to the control circuit 36.

The control circuit 36 operates in response to a null measuring equipment which preferably includes a light source 46 which sends illumination through an optical aperture slot 48 in the balance beam 10 to a pair of photoresponsive devices 50 and 52. The photoresponsive devices 50 and 52 are respectively positioned above and below the optical slot 48 so as to be equally illuminated by light from the light source 46 when the null position of the balance beam is achieved. The light source 46 may be a light-emitting diode, and the photoresponsive devices 50 and 52 may be photodiodes.

The structure of the balance beam in the vicinity of the optical aperture slot 48 may be referred to as a "flag device". It will be appreciated that, in order to operate correctly, the optical aperture slot 48 should have its sides both very accurately arranged parallel to a radius line passing through the center of the optical slot from the center of rotation of the balance beam, or the sides of the optical slot may be arranged on individual radius lines from the center of rotation of the balance beam.

In FIG. 1, the light source 46 and photoresponsive devices 50 and 52 are shown as substantially separated from the associated portion of the beam 10 and the optical slot 48. However, this is only done for the purpose of clarity in the drawing. In the actual physical embodiment, these components are closely spaced to the optical slot 48. Similarly, the permanent magnets 28-34 are shown as substantially spaced apart from the windings 24 and 26. This is also done for clarity in the presentation of the drawing. In the actual physical embodiment, these permanent stator magnets are closely spaced to the associated windings 24 and 26. That spacing is more clearly indicated by the sectional end view of FIG. 5.

All of the parts of the assembly, except the magnets 28-34, are preferably made of nonmagnetic materials so that they do not have any effect upon the operation of the electromagnetic torque generating components including the stator magnets 28-34 and the windings 24, 26.

The main body of the balance beam 10 is rigidly attached to the crossbeam 12, the mutual attachment being accomplished at the center point of each beam.

The upper ends of each of the tension members 14A, 14B are attached to a fixed support 54. The supporting structure for that fixed support is illustrated more fully in FIG. 2, and is described in more detail below.

The tension members 14A and 14B preferably continue below the points of attachment 15A and 15B, and the lower end of each of these tension members is attached to a double leafspring member 56. The spring member 56 is adjustably attached to a fixed frame member at its center point 58, and the two ends of the spring member 56 respectively place the two tension members 14A and 14B under tension. The amount of this tension is a major determinant of the amount of the restoring force applied by the tension members 14A and 14B to the balance beam 10.

In an alternative embodiment of the invention, the lower portions of the tension members 14a and 14B, below the respective points of attachment 15A and 15B, may be omitted, with the crossbeam 12 simply suspended from the respective tension members 14A and 14B. However, the illustrated embodiment is preferred because it provides additional stability to the assembly.

It will be appreciated that a major advantage of the balance beam suspension structure, including the vertically arranged tension members 14A and 14B, is that the vertical position of the crossbeam 12, and thus the pivot point of the microbalance beam 10, is substantially fixed. This is true because the metal tension members 14A and 14B do not stretch. On the other hand, these metal tension members are quite flexible to bending, so that rotation of the crossbeam 12, and the balance beam 10 is not restricted and not subject to any friction. Thus, a vertically stable, friction-free, microbalance structure is achieved by the present invention.

In operation, the electromagnetic torque generating apparatus comprising the windings 24 and 26 and the associated stator magnets 28-34 may alone overcome the beam displacement caused by the weight to be measured which is placed in pan 16. Alternatively, a known counterweight may be placed in the counterweight pan 20, and the electromagnetic force may be used only to overcome the difference in weights between the unknown weight in pan 16 and the known counterweight in pan 20. As a further alternative, the apparatus may be designed to carry the unknown material in the pan 20, and the counterweight in pan 16. In another alternative mode of operation, the counterweight in the pan 20 may be intentionally chosen to exceed the weight of the unknown material in pan 16. Thus, the servo system including the photodetectors 50 and 52, the control circuit 36, and the windings 24, 26 may be designed to operate in either direction in accomplishing a balancing operation for null positioning of the balance beam 10.

While the servo system including the photodetectors 50 and 52, and windings 24, 26, must necessarily operate upon the basis of some position error, it has been found that the beam 10 is returned to within about one percent of the actual physical null position from an initial deflection.

Figure 2:
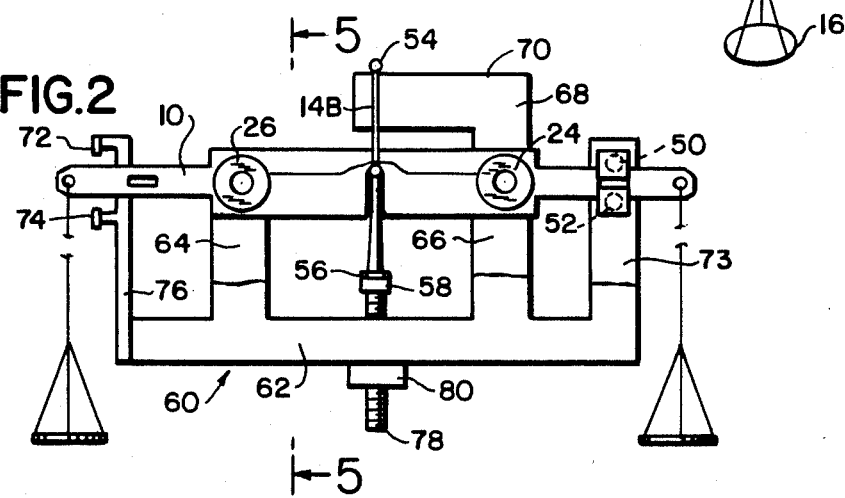
FIG. 2 is a side view, partially in section, of the embodiment of FIG. 1 and illustrating additional components including a supporting frame.

FIG. 2 is a side view, partially in section, of the embodiment of FIG. 1 with the stator magnets 28 and 32 omitted, and with the light source 46 omitted, but illustrating a supporting frame 60 for the fixed components. Frame 60 is shown to include a main frame member 62 with a vertical support arm 64 to support stator magnet 34, and a vertical support arm 66 to support stator magnet 30. Arm 66 includes a vertical extension 68 and a horizontal extension 70 to support the upper end of tension member 14B by means of the support member 54. The frame member 62 also includes a vertical extension 73 to support the photoresponsive devices 50 and 52. The frame member 62 also includes vertical supports, not shown in full in FIG. 2, for the other stator magnets, for the light source 46, and for the other end of tension member support 54.

In order to prevent extreme deflections of the balance beam 10, fixed stop members 72 and 74 are preferably provided. Stop members 72 and 74 are fixed and supported upon a vertical member 76 which is attached to the base member 62. Since the balance beam must move into a balanced positin between the stop members when measurements are being taken, stop members 72 and 74 do not interfere with accurate measurements.

The spring member 56 is preferably held down by means of a threaded tension member 78 which is attached to the center portion 58 of the spring member. The tension force applied at the bottom of the tension members 14A, 14B by the spring member 56 is preferably adjustable by adjusting the position of the center 58 of the spring member with respect to the base member 62. This is accomplished by means of a thumb nut 80 on tension member 78.

The tension members 14A, 14B are preferably formed as a rectangular cross section ribbon of metal. At the pivot attachments 15A, 15B, the small dimension of this metal ribbon is preferably aligned with the length of the beam 10 to minimize the resistance to flexing of the ribbon. Providing a wider dimension perpendicular to the beam 10 provides for greater strength in the tension member and greater lateral mechanical stability in the support of the beam. As illustrated in an exaggerated form in FIG. 2, the ribbon material of each tension member 14A, 14B may preferably be twisted in a quarter turn between the pivot points 15A, 15B and the attachment of the lower end of each tension member to the spring 56.

Figure 3:
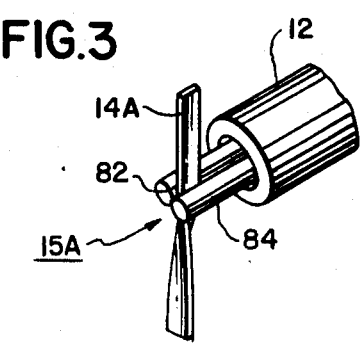
FIG. 3 is an enlarged perspective view illustrating a preferred method of attachment of a beam pivot crossbeam to a vertical flexible metal tension member in the embodiment of FIG. 1.
Figure 4:
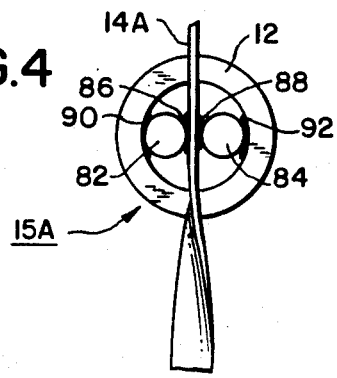
FIG. 4 is an enlarged end view further illustrating the attachment structure of FIG. 3.

In order to minimize the restoring force of the tension members upon the balance beam 10, the fixed attachment of each of the ends of the crossbeam 12 to the respective tension members 14A, 14B at the pivot points 15A, 15B is preferably carried out by a fastening means which engages and restricts a minimum length dimension of each associated tension member. One preferred fastening means structure which accomplishes this purpose is illustrated in FIGS. 3 and 4. As illustrated in the enlarged detail view of FIG. 3, the crossbeam 12 is preferably in the form of a hollow tube, or at least includes a central opening in each end thereof. Into the hollow end of crossbeam 12 there are inserted two tiny pinch roller members 82 and 84 which engage and pinch opposite sides of the tension member ribbon 14A. If the crossbeam 12 is simply an open tube, the pinch roller members 82 and 84 extend all the way through the crossbeam 12 and protrude at each end, so that the same pinch roller members engage both of the ribbon tension members 14A and 14B.

The structure of FIG. 3 is further illustrated in an end view of FIG. 4, which is enlarged to an even greater extent than FIG. 3. As illustrated in FIG. 4, the pinch rollers 82 and 84 are permanently attached to the associated ribbon 14A by the application of a minute amount of solder on each side of the tension member ribbon 14A as illustrated at 86 and 88. It will be appreciated that, because of the minute dimensions of the pinch rollers 82 and 84 (preferably only about 500 micrometers in diameter) a minimum length dimension of the tension member ribbon 14A is engaged and restricted, thus minimizing the restoring force imparted to the balance beam. As indicated at 90 and 92, the pinch rollers 82 and 84 are preferably also attached by means of solder to the inside surface of the crossbeam 12. The quarter turn twist in the lower end of the tension member 14A is exaggerated for clarity in FIGS. 3 and 4.

In a preferred physical embodiment, the tension member ribbons 14A, 14B may have very small cross sectional dimensions, being typically only about 25 micrometers in thickness, and 500 micrometers in width. The metal of which the tension member ribbons is composed is preferably hard and springy, and has a high tensile strength. One preferred material for this purpose is a precious metal alloy containing gold and palladium. A material which has been found to be satisfactory is available under the trademark "Paliney 6" from the J. M. Ney Corporation.

FIG. 5 is a sectional end view taken at section 5—5 of FIG. 2, but illustrating a slight modification of the invention. Also, in FIG. 5, the background details have been omitted in order to promote clarity.

In the embodiment of FIGS. 1 and 2, the windings 24 and 26 are shown as unitary windings which are placed on one side of the balance beam 10. As an alternative, illustrated in FIG. 5, the winding 26 is divided into two separate windings 26A and 26B placed on opposite sides of the body of the beam 10, each of the smaller windings 26A and 26B having a smaller axial thickness dimension. This divided winding structure is preferred since it provides for a more balanced structure.

As particularly illustrated in FIG. 5, the permanent magnets 32 and 34 are preferably individually mounted upon threaded shaft mountings 94 and 96. By adjustment of the associated thumbscrews 98 and 100, the shaft mountings 94 and 96 may be rotated and the axial positions of the magnets 32 and 34 may be adjusted with respect to the windings 26A and 26B. The windings 26A and 26B are preferably centered between the permanent magnets 32 and 34. Similarly, in the embodiment of FIG. 1, the winding 26 is centered between the magnets 32 and 34.

Figure 6:
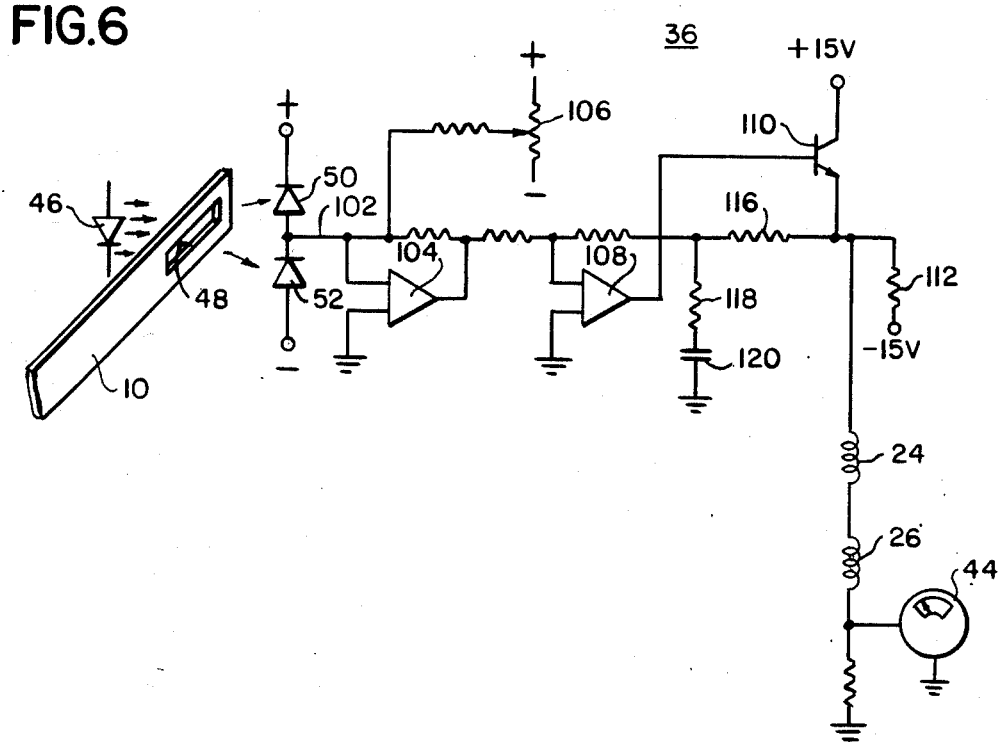
FIG. 6 is a schematic circuit diagram illustrating a preferred configuration of the control circuit for the embodiment of FIG. 1.

FIG. 6 is a simplified schematic circuit diagram illustrating a preferred arrangement of the control circuit 36 of FIG. 1 together with the associated components. For the sake of clarity, FIG. 6 includes the light source 46, which is illustrated in FIG. 6 as a light-emitting diode. Likewise, the photosensors 50 and 52 are illustrated in FIG. 6 as photodiodes. The optical slot 48 is also illustrated in FIG. 6.

Any imbalance in the signals from photodiodes 50 and 52 is detected on the common connection 102 to control the input to a preamplifier 104. A zero adjustment is preferably provided by means of a potentiometer 106 to adjust the input to amplifier 104 to zero at the desired null position of the beam 10. Photodiodes 50 and 52 are preferably thermally matched.

Any error signal, as amplified by amplifier 104, is further amplified by operational amplifier 108, which controls the current in a transistor 110 having its base-emitter circuit connected in the feedback loop of amplifier 108. The collector electrode of transistor 110 is provided with a positive 15 volt source, and the emitter electrode is biased with a negative 15 volt source. The transistor 110 controls the balance between its own impedence and the positive 15 volt source and an impedence 112 connected to the negative 15 volt bias to thereby control the current through connection 40 to the windings 24 and 26, and thus through an impedence 114 to ground. The impedence 114 operates as a current shunt across which the meter 44 can measure the voltage as a measurement of the current flow through the windings 24 and 26. In order to provide some degree of anticipation in the balancing circuit, so as to reduce oscillations of the microbalance beam prior to achieving balance, a lead network including resistors 116 and 118 and capacitor 120 is preferably provided in the feedback loop of amplifier 108.

Referring back again to FIG. 1, the winding 24 operates within the stator field provided by the permanent magnets 28 and 30 in a manner which is independent from the operation of the winding 26 within the stator field set up by the permanent magnets 32 and 34. Thus, the operation of winding 24 within the first stator field is magnetically independent of the operation of the winding 26 within the second stator field, even though the torque effects of the two windings within their respective fields are additive. Each winding 24, 26, with its associated permanent magnet stator field elements, may be referred to as an electromagnetic assembly.

While two electromagnetic assemblies are preferred, it is apparent that a single electromagnetic assembly could be used effectively to balance the beam to the null position.

The preference for two electromagnetic assemblies is based partly upon the objective of making the structure of the balance beam perfectly symmetrical. However, another advantage of the use of the two electromagnetic assemblies is that the two windings 24 and 26 are wound in such a way, and connected in such a way that any change in an ambient magnetic field will be compensated by the two windings so that magnetic shielding is not required for the instrument in order to maintain its accuracy.

In order to provide for the maximum accuracy and efficiency of the electromagnetic assemblies and the electrical balance control circuitry, all of the materials of the entire structure are preferably nonmagnetic with the exception of the permanent magnets 28-34. Thus, the balance beam body 10 may preferably be composed of aluminum and the frame 60 is preferably composed of brass.

The vertical stability in relation to the sensitivity of the microbalance of the present invention is very outstanding. While the balance can handle an unknown weight in the order of 10 grams, it can typically measure a one milligram sample, or a change in weight of one milligram, with great accuracy, down to a noise level of one tenth of a microgram.

While the microbalance of the present invention has been presented in this disclosure as a bottom-loading balance, the principles of the invention are also applicable to a top-loading balance.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. A microbalance including a balance beam, means for attaching a weight to be measured to one end of said balance beam, electromagnetic torque generating means connected to said balance beam for overcoming the beam displacement caused by a weight to be measured, means for detecting when a beam displacement has occurred and operable to generate an electrical signal to control said torque generating means to thereby change the torque to balance said beam to a null position, means for measuring the current of said torque generating means as a measure of the weight to be measured, a mounting means for said balance beam comprising at least two vertically aligned elongated flexible metal tension members, the upper ends of said tension members being attached to a fixed support, a crossbeam fixedly attached to said balance beam at a point of attachment intermediate to the ends thereof to form a pivot beam for said balance beam, said point of attachment being intermediate to the ends of said crossbeam, the ends of said crossbeam being fixedly attached respectively to portions of said tension members below said fixed support attachment.

2. A microbalance as claimed in claim 1 wherein said balance beam is substantially centered upon said crossbeam.

3. A microbalance as claimed in claim 1 wherein each of said tension members extends substantially below the point of attachment to said crossbeam and wherein the lower end of each of said tension members is attached through a tension means to a fixed support.

4. A microbalance as claimed in claim 3 wherein said attachments of the respective lower ends of said tension members through tension means to a fixed support include a common connection means for simultaneous adjustment of tension on both of said tension members.

5. A microbalance as claimed in claim 3 wherein said tension members each comprise a thin filament of high tensile strength.

6. A microbalance as claimed in claim 5 wherein said tension member filaments consist essentially of a rare metal alloy.

7. A microbalance as claimed in claim 5 wherein each of said filaments is in the form of a thin narrow ribbon.

8. A microbalance as claimed in claim 7 wherein a quarter turn is provided in each ribbon in the portion between the point of attachment to said crossbeam and the attachment of the lower portion to a fixed support through said tension means.

9. A microbalance as claimed in claim 1 wherein said means for detecting when a beam displacement has occurred comprises a flag device at one end of said balance beam, said flag device including an optical aperture slot aligned substantially parallel to a radius line from the center of rotation of said balance beam, a light source positioned on one side of said slot at an elevation even with said slot in the balanced position of said balance beam, two photoresponsive devices vertically arranged above and below the balanced position of said optical slot to detect light transmitted through said optical slot from said light source and to thereby detect an imbalance condition in the light received by said photodetectors as a measure of any deflection of said balance beam.

10. A microbalance as claimed in claim 1 wherein said electromagnetic torque generating means comprises at least one electromagnetic assembly including an electromagnetic rotor winding spaced radially outwardly by a substantial dimension from said crossbeam, said electromagnetic assembly including a fixed magnetic stator structure positioned and arranged to interact magnetically with said rotor winding.

11. A microbalance as claimed in claim 10 wherein said magnetic stator structure comprises at least one permanent magnet.

12. A microbalance as claimed in claim 11 wherein said magnetic stator structure includes two permanent magnets, said two permanent magnets being arranged on opposite sides of said rotor winding and spaced apart from said rotor winding with opposite poles in respective alignment and with the two poles of each of said magnets being vertically arranged with respect to one another to thereby create two oppositely directed magnetic fields in the air gap between said stator magnets to which said rotor winding is subjected.

13. A microbalance as claimed in claim 12 wherein said electromagnetic torque generating means comprises two of said electromagnetic assemblies spaced at on opposite sides of said balance beam with the respective rotor windings being connected to assist one another in generating the electromagnetic torque for overcoming beam displacement.

14. A microbalance beam assembly comprising a balance beam, means for attaching a weight to be measured to one end of said balance beam, a mounting means for said balance beam comprising at least two vertically aligned elongated flexible metal tension members, the upper ends of said tension members being attached to a fixed support, the lower ends of said tension members being attached to a fixed support, the attachment of one end of each of said tension members to a fixed support being carried out by a tension means, a crossbeam fixedly attached to said balance beam at a point of attachment intermediate to the ends thereof to form a picot beam for said balance beam, said point of attachment being intermediate to the ends of said crossbeam, the ends of said crossbeam being fixedly attached respectively to intermediate portions of said tension members.

15. A microbalance as claimed in claim 14 wherein the fixed attachment of each of the ends of said crossbeam to said respective tension members is carried out by a fastening means which engages and restricts a minimum length dimension of each associated tension member so as to minimize the restoring force imparted by each tension member to the balance beam.

16. A microbalance as claimed in claim 15 wherein said crossbeam comprises a hollow tube and wherein said fastening means for fastening each end of said crossbeam to one of said tension members comprises two pinch rollers extending through the central opening of said crossbeam and extending from each end of said crossbeam, the protruding ends of said pinch rollers engaging opposite sides of each of said tension members, and solder means permanently fixing said pinch rollers to said associated
tension members and fixing the positions of said pinch rollers within said crossbeam.

* * * * *